United States Patent [19]

Le Paih

[11] Patent Number: 5,618,229
[45] Date of Patent: Apr. 8, 1997

[54] MACHINE TO TRANSFORM A FILLED SAUSAGE CASING INTO A TWISTED SAUSAGE CASING, IN PARTICULAR FOR PRODUCING SAUSAGE PORTIONS

[75] Inventor: Jacques Le Paih, Plumeliau, France

[73] Assignee: Nijal (SA), Baud, France

[21] Appl. No.: 542,387

[22] Filed: Oct. 12, 1995

[30] Foreign Application Priority Data

Oct. 20, 1994 [FR] France ................................. 94 12766

[51] Int. Cl.[6] ............................................ A22C 11/10
[52] U.S. Cl. ................................................ 452/47; 452/46
[58] Field of Search ...................... 452/47, 46, 48

[56] References Cited

U.S. PATENT DOCUMENTS

| | | |
|---|---|---|
| 1,384,050 | 7/1921 | Cramer . |
| 1,419,985 | 6/1922 | Reisfeld . |
| 1,459,066 | 6/1923 | Kruse ........................................ 452/47 |
| 1,504,010 | 8/1924 | Zdechlik . |
| 2,134,862 | 11/1938 | Dannam ................................ 452/47 |
| 2,482,911 | 12/1946 | Holstein . |
| 3,408,687 | 11/1968 | Amundson ............................ 452/46 |
| 4,112,546 | 9/1978 | Müller ................................... 452/47 |
| 4,959,888 | 10/1990 | Nerhus et al. . |

FOREIGN PATENT DOCUMENTS

| | | |
|---|---|---|
| 2214413 | 1/1974 | France . |
| 0179769 | 3/1906 | Germany . |
| 3323659 | 7/1983 | Germany . |
| 910244 | 11/1962 | United Kingdom ................... 452/47 |

*Primary Examiner*—Willis Little
*Attorney, Agent, or Firm*—Roland Plottel

[57] ABSTRACT

The machine of the invention comprises downstream a squeezing device defining portions (P), successive pairs of first and second plates (1), 1') disposed parallel inside which the portions (P) are engaged. The first and second plates (1, 1') of each pair move forward in the machine by keeping their spacing and remaining longitudinally in coincidence, whilst moving transversally at the same speed but in opposite directions so as to make the portion (P) they enclose rotate. Secondly, the transversal movement directions are alternate between the first successive plates (1) and between the successive second plates (1'). Consequently, the continuous filled-up casing (B) driven by the pairs (1, 1') advances inside the machine in the form of successive portions (P) between which a twist is formed.

14 Claims, 4 Drawing Sheets

MACHINE TO TRANSFORM A FILLED SAUSAGE CASING INTO A TWISTED SAUSAGE CASING, IN PARTICULAR FOR PRODUCING SAUSAGE PORTIONS

BACKGROUND OF THE INVENTION

The present invention concerns a machine to transform a filled sausage casing into a twisted chain, said machine being more particularly intended for producing sausage portions.

In most devices for producing sausages separated from one another by a twist effected on a sausage casing, it is the filling device of the sausage casing itself which acts to embody the twist. To this effect, the filling device comprises a filling tube or mandrel which is placed in rotation after each operation injecting an amount of meat into the sausage casing, the sausage just formed being immobilised in rotation. This occurs with the devices described in the patents FR-A-2214413 and FR-A-2544171.

These systems have the drawback of being relatively slow with respect to machines solely carrying out the filling of sausage casings. Moreover, they are relatively complex.

SUMMARY OF THE INVENTION

With a view to resolve these drawbacks, the object of the invention is to provide a twisted chain placing machine which is separated from a machine for filling the sausage casing, and able to support the cycle rates imposed by the latter and which has a simple structure and easy to operate.

Another aim of the invention is to ensure that this machine can be easily cleaned.

To this effect, a machine in the shape of a twisted chain for placing a sausage casing is characterised in that, downstream of an inlet intake for said sausage casing or continuous filled-up casing, it includes:

a device for squeezing the continuous filled-up casing for defining portions; and successive pairs formed from a first plate and a second plate disposed in parallel inportion which said portions defined by said squeezing device are engaged according to a squeezed contact relation;

the first and second plates of each pair moving forward in the machine from said squeezing device by retaining their squeezed contact relation on said portions and remaining longitudinally in coincidence, whilst moving transversally at the same speed but in opposite directions so as to make the portion they contain rotate;

whereas the directions of transversal movement are alternate between said first successive plates and between second successive plates;

so that the continuous filled-up casing driven by said pairs advances into the machine in the form of successive portions between which a twist is formed by virtue of their alternate sense of rotation.

According to another characteristic of the invention, firstly all the first plates and secondly all the second plates are mounted in two identical endless-strip arrangements in which each plate is able to move transversally, the two arrangements being disposed in such a way that two of their portions are parallel to each other so that said pairs of the first and second plates in which the continuous filled-up casing moves are formed along said portions.

In the upper endless strip disposition, each plate may be provided with a slight freedom of movement so that along said portions facing each other in parallel, the spacing of the upper plate with its lower counterpart may vary according to the size of the continuous filled-up casing placed between them, the upper plate resting on the continuous filled-up casing via its own weight.

In one preferred embodiment, each endless-strip arrangement includes two identical lateral chains engaged on upstream and downstream return means between which transversal slides bearing the plates are mounted.

According to another characteristic of the invention, said device for squeezing the continuous filled-up casing is formed by two rotating elements cooperating with each other, the two elements being mounted integral in rotation respectively on the shafts of the upstream return means of said endless strip arrangements.

According to another characteristic of the invention, the machine further includes a cutting device for sectioning the twists embodied between the portions so as to individualise the latter or even groups of the latter.

In one embodiment and as similarly with the squeezing means, said cutting device is composed of two rotating elements co-operating with each other, the two elements being mounted integral in rotation respectively on the shafts of the downstream returning means of said endless strip arrangements.

In one embodiment variant, said squeezing device consists of upper transversal pressing elements each mounted in a gap between the upper plates, and lower transversal pressing elements each mounted in a gap between the lower plates, each upper pressing elements cooperating with a lower pressing element so as to squeeze the incoming sausage casing, then release it so that the twist is effected at the location where the squeezing takes place. Preferably, said pressing elements generally have the shape of a roller.

To cut the portions or groups of portions, each pair of upper and lower pressing to elements is equipped with a cutting device, such as a pair of scissors.

In the endless strip arrangement (comprising lateral chains), said pressing elements are mounted on the chains. The chains pass into guides along said faces parallel to each other, said guides form cams so that along one upstream portion of said faces parallel to each other, said upper and lower pressing elements of a given pair draw closer to squeeze the continuous filled-up casing and then next move apart so as to enable the sausage casing to be twisted.

DESCRIPTION OF THE DRAWINGS

Other characteristics and advantages of the invention shall be more readily understood on reading the following description with reference to the accompanying drawings on which.

DESCRIPTION OF THE PREFERRED EMBODIMENTS

Figure 1:
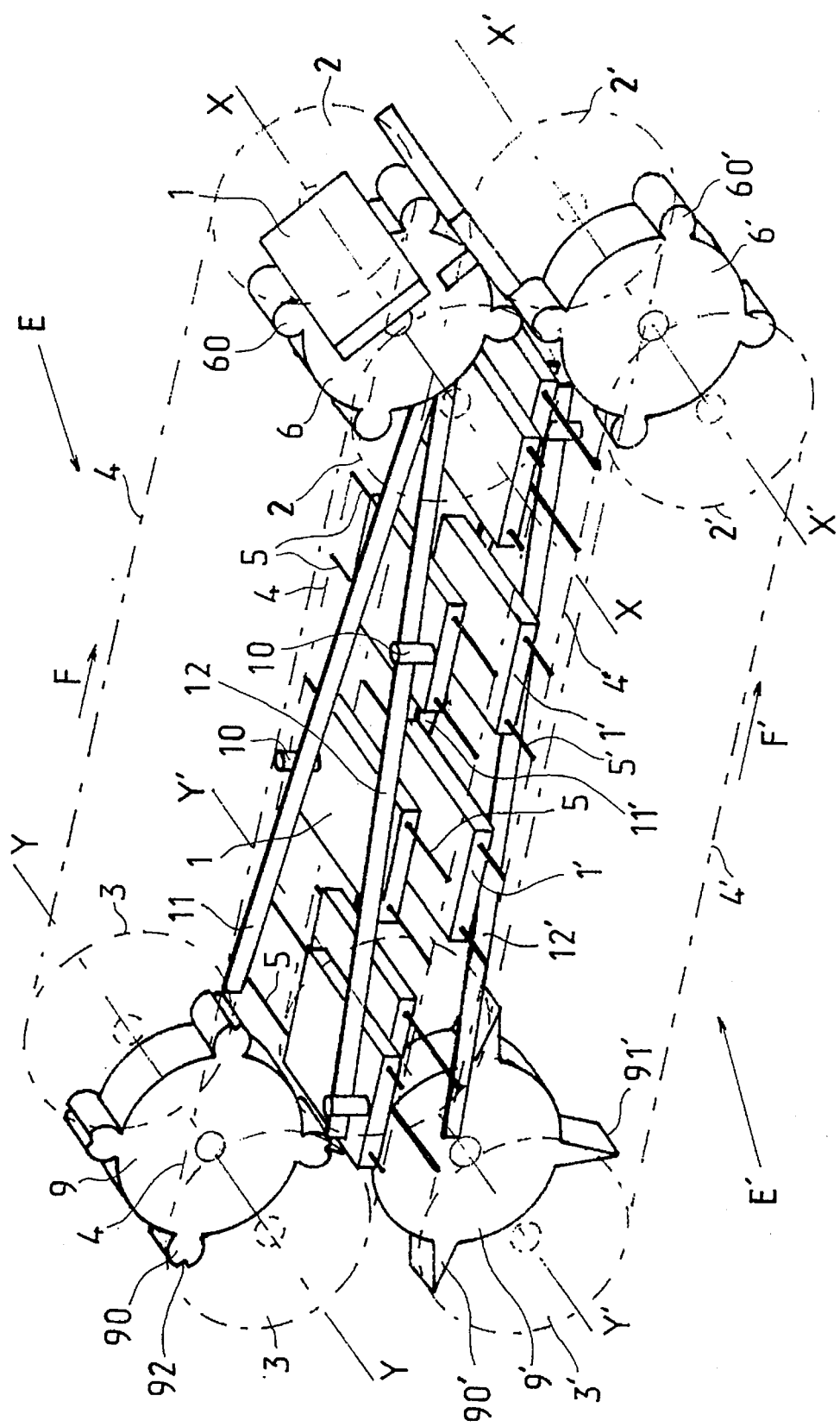
FIG. 1 is a perspective diagrammatic view showing the main elements of one embodiment of the invention.
Figure 2:
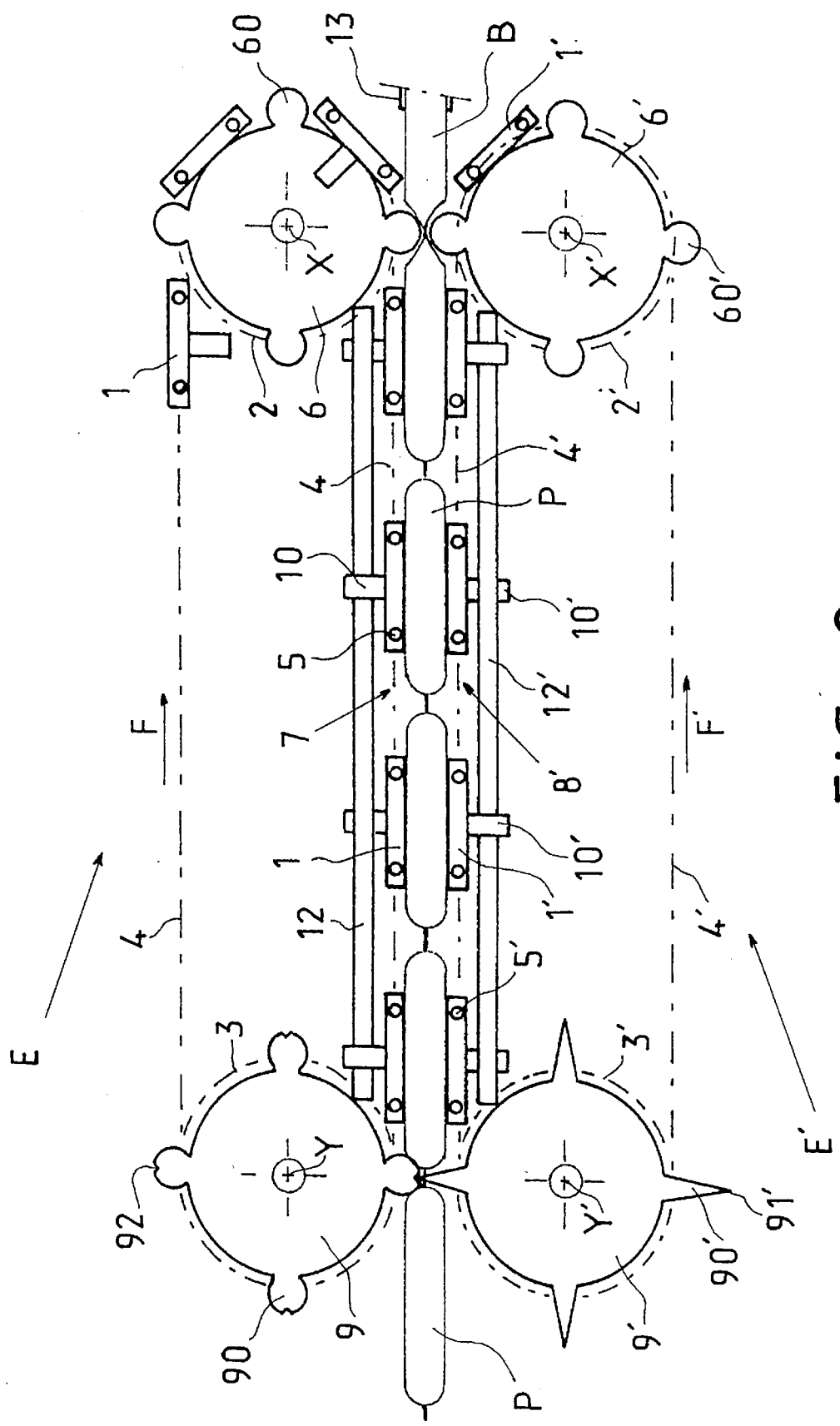
FIG. 2 is a diagrammatic portion view of the same machine.

FIGS. 1 and 2 firstly show a machine according to the invention and is mainly composed of two units E, E' with plates 1, 1' mounted according to two identical superimposed endless strip arrangements.

The upper endless-strip arrangement or unit E includes two upstream lateral intermediate gear wheels 2 mounted integral in rotation around an axis X—X and two downstream lateral intermediate gear wheels 3 mounted integral in rotation around an axis Y—Y. Mounted on these wheels are two lateral chains 4. These various elements have been shown roughly on FIG. 1 so as to provide clarity of the drawing.

The lateral chains 4 bear transversal slides on which plates 1 are mounted sliding, that is two slides per plate. So as to again render the drawings more understandable, only certain of these elements have been shown.

Along the endless strip, the plates 1 and 2 follow each other according to a regular spacing. In practice, the plates 1 are flat plates whose face on the external portion is preferably ribbed in the longitudinal direction, for reasons to be explained subsequently.

At its upstream end, the unit E further comprises an element 6 in the general shape of a disk mounted integral in rotation with the intermediate gear wheels 2 around the axis X—X in a median position between the latter. At regular intervals around its periphery, the element 6, which has certain thickness, comprises on its edge bosses or lugs 60 having the same thickness in the general shape of a transversally centered cylinder. The spacing of the bosses 60 is such that they are engaged in the free spaces between successive plates 1 when the latter pass around the upstream returning means, thus externally projecting with respect to the plates. This is clearly shown on FIG. 2.

A unit E' similar to the unit described above is disposed under the unit E, the two units E and E' being exactly superimposed. Giving the fact of their identical nature, the lower unit shall be described again and its elements common with the upper unit bear the same references matched of the prime sign.

Thus, the lower portion 7 of the unit E is located exactly opposite the upper portion 8' of the unit E', their spacing depending on the size or diameter of the products to be processed. In practice, so as to keep the spacing of the portions 7 and 8' constant over the entire length, the lateral chains 4 and 4' in guides integral with the frame are made to pass along the portions. Moreover, an ability to adjust the position of these guides shall be a simple way for modifying the spacing of the portions 7 and 8' so as to make it possible to process products of various sizes.

At a variant or complement and as it shall be seen subsequently in FIGS. 4, 5a and 5b, the upper plates 1 may have a limited freedom of movement perpendicular to their plane on the transversal slides 5.

A synchronisation mechanism (not shown) is fitted between the two units E and E' having a common driving device, so that firstly their unwinding speeds are equal, and that secondly, the plates 1 and 1' move forward per upper plate 1 and lower plate 1' pair exactly superimposed in the longitudinal direction along the portions 7 and 8'.

As regards the two elements 6 and 6' which when operating rotate in the opposite direction as indicated by the arrows F and F', these are fitted in such a way that their bosses 60 and 60' pass two by two opposite each other where the portions 7 and 8' begin, thus forming between them a significant narrowing with respect to the spacing of the upper and lower plates 1 and 1' along the portions 7 and 8. FIG. 2 shows that in effect they draw closer until they practically touch each other.

The units E and E' further comprise means to transversally move their respective plates when the latter move along the portions 7 and 8'. As shown on the drawings, these means firstly include a finger 10 or 10' projecting orthogonally onto the internal face of each plate 1 or 1', and secondly longitudinal guides for said fingers.

FIG. 1 clearly shows two longitudinal rectilinear guides 11 and 12 placed above the lower portion 7 of the unit E. These two guides are symmetrically placed on each portion of the median plane of the portion 7. They start from a central position to the upstream extremity and diverge so as to end close to the portions of the fragment at the downstream extremity.

The finger 10 of each plate 1 is placed close to one of its lateral portions, as shown on FIG. 1. Between successive plates, the fingers are in alternate position on either portion. Consequently, if a plate 1 is deviated towards the right by the guide 11 along the portion 7, the next plate shall be similarly deviated, but in the opposite direction, that is towards the left, by the guide 12. It is to be noted that on the return portion, guiding means (not shown) bring back all the plates into the appropriate starting position along the portion 7.

In the unit E', longitudinal guides 11' and 12' corresponding to the guides 11 and 12 are mounted under the portion 8'. As it can be seen on FIG. 1, the guides 11 and 11' and the guides 12 and 12' are parallel two by two and are superimposed inportion vertical planes. As in the unit E, the plates 1' shall be transversally deviated in both directions alternately when they advance along the portion 8'.

On the other hand, in the plates 1 and 1' of each pair which shall advance in longitudinal coincidence along the portions 7 and 8', the fingers 10 and 10' are alternate on both portions. Thus, when they advance along the portions 7 and 8', the plates 1 and 1' of a given pair shall move transversally at the same speed, but in the opposite direction.

There now follows a description of the functioning of the machine with reference to FIG. 2. A continuous filled-up casing of the product B to be processed has been put into the machine via an inlet pipe 13 aligned with the passage defined between the portions 7 and 8' at the level of the squeezing elements 6 and 6'.

As it moves forward in the machine, the continuous filled-up casing B is crushed by the squeezing elements at regular intervals corresponding to the length of the portion P. Given the fact of the arrangement in the units E or E' of the plates and bosses of the squeezing elements (namely that the plates are fitted between the bosses by passing around the upstream returning means), crushing of the continuous filled-up casing is effected exactly in the gap between successive plates and the formed portions P are engaged inportion each pair of plates 1 and 1'.

Along the portions 7 and 8', the portions P driven by the lower plate and the upper plate between which they are engaged, shall roll onto one another without varying their transversal position, given the fact that said plates move transversally in opposition at the same speed. Secondly, because of the alternation of the transversal movements between successive pairs of corresponding plates, the successive portions rotate on themselves in alternate directions so that the sausage casing is twisted along the strands 7 and 8' in the gap separating the pairs of plates 1 and 1'.

The purpose of the longitudinal ribs mentioned earlier provided on the outer faces of the plates 1, 1' is to avoid any relative sliding between these faces and the casing of the continuous filled-up casing B and improve the driving in rotation of the portions along the portions 7 and 8'. As a complement, transversal ribs may also be provided on these same faces so as to improve the behaviour of the portions P inside the pairs of plates 1, 1' in a longitudinal direction.

So as to embody twists as best as possible between the portions P, it is appropriate to be abler to control the number of revolutions the portions P carry out along the portions 7 and 8' according to their diameter or the quality of the sausage casing used. In order to do this, it is possible to modify the amplitude of the transversal movement of the plates 1 and 1' along the portions 7 and 8 by adjusting the divergence of the guides 11, 11', 12 and 12'.

The machine shown on the drawings also includes a cutting device which detaches the portions P at the downstream extremity of the portions 7 and 8' by sectioning the twist which has been formed between them.

In the embodiment shown, this cutting device comprises two elements disposed on the axes Y—Y and Y'—Y' of the downstream return means of the units E and E' aligned longitudinally with the squeezing means 6, 6'. Like these, these are elements having the general shape of a disk 9, 9' which are rendered integral in rotation with the downstream return means of the units E and E' respectively.

One of these elements, in this instance the upper element 9, comprises at its periphery rounded bosses or lugs 90 extending radially regularly spaced from one another and consisting of the same number as that of the bosses 60 of the squeezing element 6.

When the plates 1 move around the downstream return means of the unit E, the plates 1 enter between the bosses 90 gearing slightly like teeth in the gaps between said plates, but of course without coming into contact with the latter.

The other element of the cutting device, namely the lower element 9', also comprises at its periphery bosses 90' extending radially and being of the same number as that of the bosses 90 of the element 9 and also regularly spaced.

In the same way as the plates 1 of the unit E, those of the unit E' enter between the bosses 90' when they move around the downstream return means.

The bosses 90' of the lower element 9' viewed from the side have a triangular profile so to outwardly exhibit an outer cutting transversal edge 91'. As a variant, this outer edge may be equipped to bear an element with an interchangeable blade.

For their part, the bosses 90 of the upper element 9 have in their most extreme zone for co-operating with the cutting edge 91' of the bosses 90' a transversal throat-shaped portion 92 with a V-shaped profile.

The elements 9 and 9' are mounted in such as way that at the end point of the portions 7 and 8, the cutting edge 91' (edge or blade) of a boss 90' penetrates into the throat 92 of a corresponding boss 90. As the bosses 90 and 90' are located engaged in the gaps between the plates, this penetration of the cutting edge 91' into the throat 92 shall of necessity be made at the level of a twist between the portions and said twist is thus sectioned. During operation, each product portion P when freed from the pair of plates in which it has transited along the portions 7 and 8' is therefore detached from the following ones so as to come out the machine in a single piece.

Figure 3:
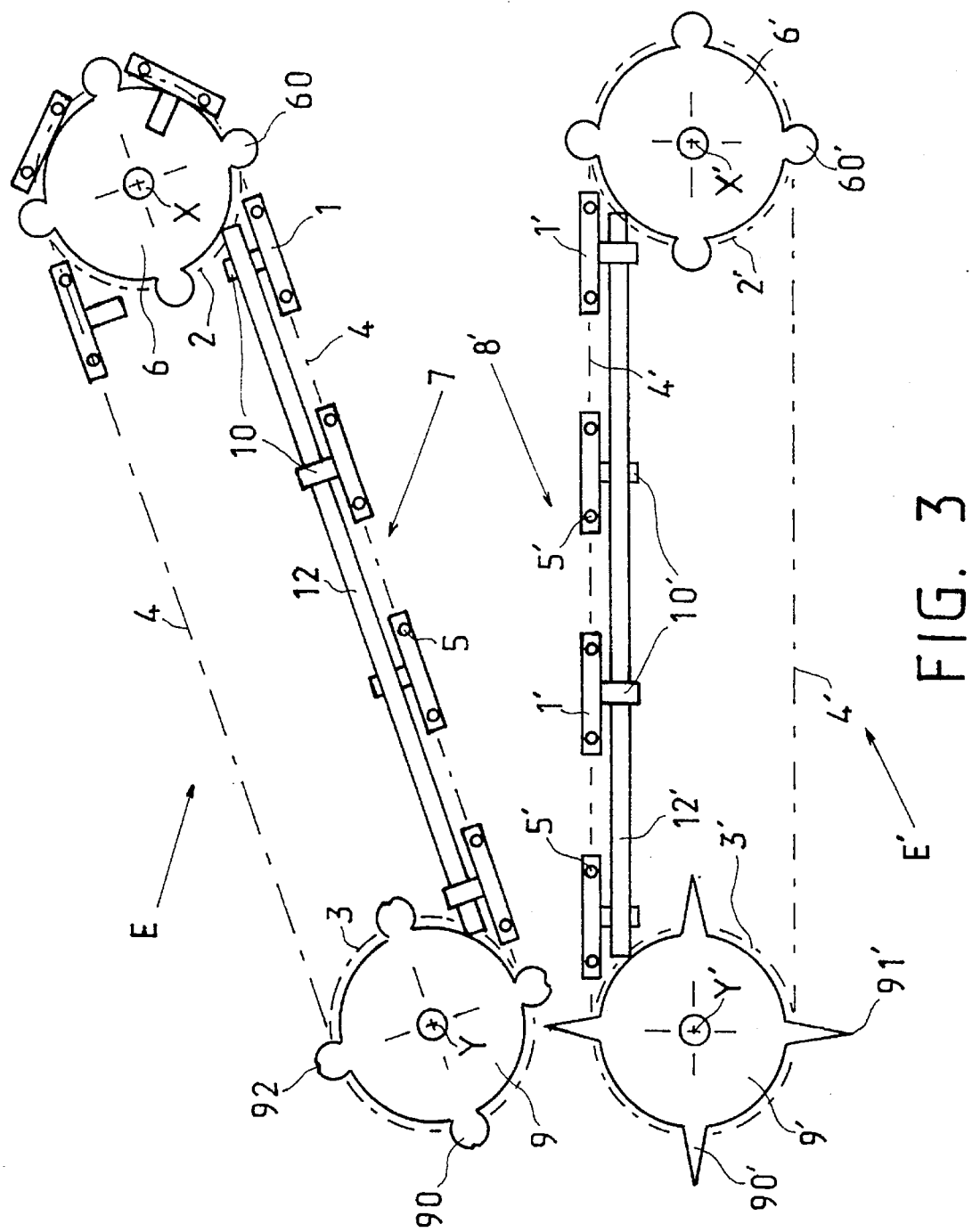
FIG. 3 is a view similar to FIG. 2 and which shows an opening position of the machine.

FIG. 3 diagrammatically shows the machine described above in an opening position which clearly shows that cleaning is rendered extremely simple owing to the accessibility of the portions 7 and 8' which are clearly spaced from one another.

To allow for this opening, the frame of the machine is composed of two portions; one lower portion bearing the unit E' and an upper portion bearing the unit E joined to said lower portion. On FIG. 3, the upper frame portion is joined to the lower frame portion around the axis Y—Y of the downstream return means of the upper unit E.

Figure 4:
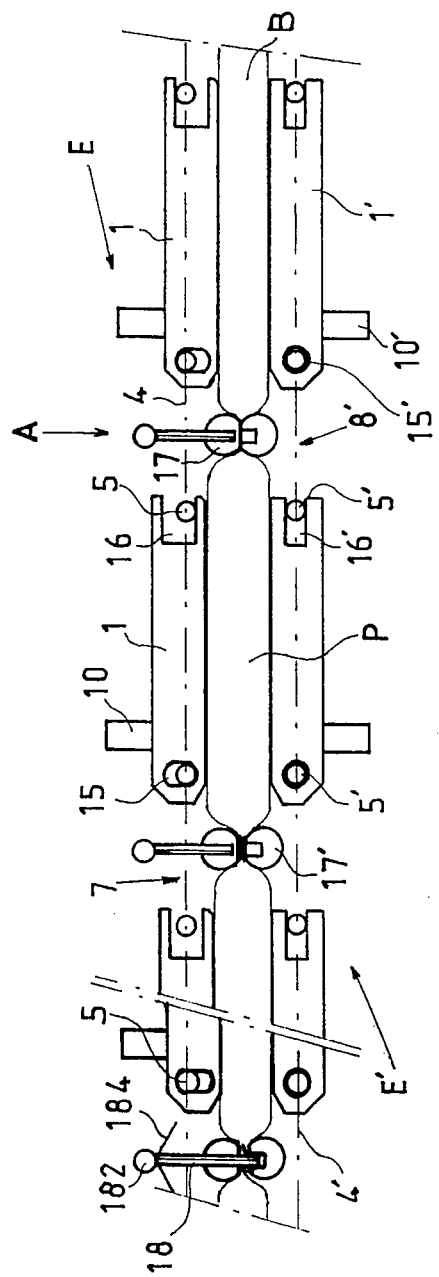
FIG. 4 is a partial portion view showing one embodiment variant of the invention.
Figure 5B:
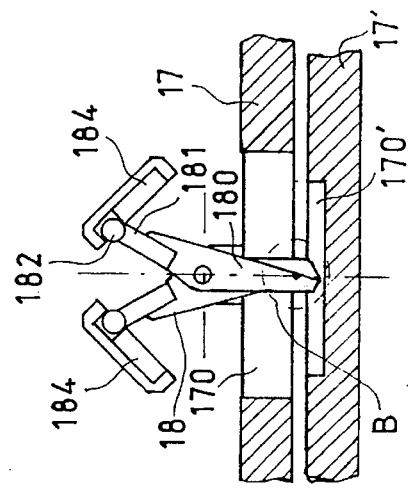
FIGS. 5a, 5b are skeleton views representing the association of a cutting device with a squeezing device and their functioning.
Figure 5A:
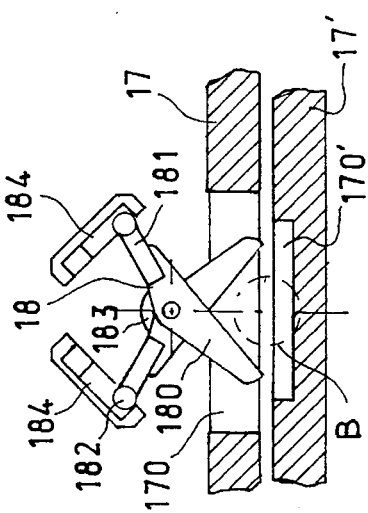

FIGS. 4, 5a and 5b are partial views illustrating the particular characteristic features of another machine according to the invention which is only distinguished from the one described above by virtue of its sausage casing squeezing device and its cutting device, as well as by virtue of a more elaborate disposition of its upper plates.

Apart from that, it comprises the same endless strip arrangements to which the same references E and E' have thus been attributed, as well as to the common elements: plates, slides, lateral chains, portions parallel to one another. Of course, in these arrangements, there is no squeezing elements 6 and 6' or cutting elements 9 and 9', but on the other hand, it can still open as shown on FIG. 3.

FIG. 4 solely and partially shows the portions 7 and 8' of the arrangements E and E' and shows the upper plates 1 each being mounted on two slides 5 at the front by means of an oblong slot 15 centered perpendicular to their plane, and at the rear by means of a groove 16 in their rear edge and having approximately the same height as the slot 15 which has a width corresponding to the diameter of the slides 5. Each plate 1 is thus fully longitudinally secured with respect to the chains 4 so that it shall still remain in strict correspondence with its counterpart 1' of the lower arrangement 1' with which it forms a pair. On the other hand, along the portion 7, each plate 1 shall be able to move slightly on its slides 5 so as to be distanced from its counterpart 1' according to the size of the continuous filled-up casing B which shall accomodated between them and whose size in practice may fluctuate from one continuous filled-up casing to another and even over the length of a given continuous filled-up casing. The pressing force acting on the continuous filled-up casing B placed between the plates 1 and 1' to make it rotate shall thus result from the weight of the plate 1.

It is to be noted that the fact of providing the passage of the rear slide 5 in a groove 16 instead of an oblong slot procures two advantages; first of all, the plate is not stressed to ensure it only moves parallel to itself but can be slanted slightly, and secondly it much easier to dismantle quickly since it the suffices to disconnect only the front slide from the chain 4. It is this second advantage which justifies that the same mounting is provided by the rear grooves 16' on the slides 5' of the lower plates 1'. These grooves 16' and the passage holes 15' at the front respectively have a height and diameter corresponding to those of the slides 5'.

Secondly, at least the front edges of the contact faces with the continuous filled-up casing of the plates 1 and 1' are folded back, either bevelled as shown or fully rounded so as to avoid damaging the casing or sausage casing of the continuous filled-up casing B.

As regards the device for squeezing the sausage casing B, this occurs as follows. Provided in the central position in the gaps between successive plates 1 of the unit E and similarly in a central position in the gaps between successive plates 1' of the unit E' are transversal pressing elements 17 and 17' respectively which in practice have the general shape of rollers. They are mounted by means of block or square type fixings (not shown) on the chains 4 and 4'.

Each element or roller 17 forms a pair with an element 17', both being opposite each other along the portions 7 and 8'. In the upstream portion of the latter, that is the right-hand portion of FIG. 4, the two rollers 17 and 17' of a given pair are in support against each other by thus exerting a progressive crushing and then squeezing of the continuous filled-up casing B. To this effect, the chains 4 and 4' are engaged in guides (not shown) which form cams. Beyond the squeezing position A, the rollers 17 and 17' are slightly distanced from each other, thus releasing the squeezed portion of the continuous filled-up casing B which could therefore be twisted via the traversing movement of the plates 1 and 1', as described previously.

The rollers are preferably covered with a lining possessing a certain elastic flexibility. Secondly, it can be seen on the drawing that their squeezing surfaces appear in the form of flat surfaces and although this is not shown, it is also to provide in these pressing surfaces V-shaped notches in the zone for passage of the continuous filled-up casing B so that the continuous filled-up casing, instead of being flattened at the location of the squeezing, has its area contracted over its entire circumference, which is less aggressive for the sausage casing.

Associated with each pair of rollers 17, 17' is a twist cutting device which acts in the downstream end portion of the portions 7 and 8'. As shown in detail on FIGS. 5a and 5b, this cutting device consists of shears 18 rendered integral with one of the rollers, in this instance the upper roller 17 by a mount 183. The blades 180 of the shears 18 traverse the roller 17 via an elongated opening 170 and corresponding to a recess 170' in the roller 17'. As shown on FIG. 5a, in an opening position of the shears 18, its blades are sufficiently spaced from each other so as to avoid impeding the passage of the continuous filled-up casing B.

The closing of the shears 18 is controlled in the end portion of the portions 7 and 8' by guiding ramps 184 on which the extremities of their branches 181 are engaged which are to this effect provided with preferably spherical-shaped sliding blocks. On closing, FIG. 5b shows that the extremities of the blades 180 penetrate into the recess 170' of the roller 17 and on crossing, they section the twist which has been formed approximately at its middle. It is to be noted that it is possible to provide the scissors 18 with foldable branches 181 which makes it possible to easily neutralize certain of them if, instead of individual portions P, the user wishes to form groups of several remaining united by the twists.

In one embodiment variant, the squeezing means consist of scissor-shaped pliers provided between the plates of a unit E or E'. These pliers have V-shaped jaws which overlap during closing so as to form a closed space in which the continuous filled-up casing is taken, this close space narrowing along an upstream extremity section of the portions 7 and 8' on which the plates 1 and 1' do not move transversally. The cutting means consists of a blade borne by an arm mounted pivoting on the joint of each plier element, the blade acting along a downstream extremity section of the portions 7 and 8'. the arms of each plier element and associated cutting device are controlled by respective guides forming a cam.

At the time of tests, a prototype of the machine of the invention showed itself to be capable to reliably withstand extremely satisfactory cycles. It would be possible to multiply the yield by providing the passage of two or more continuous filled-up casings between the portions 7 and 8'.

I claim:

1. Machine to transform a filled-up sausage casing into a twisted sausage casing and in particular for producing sausage portions, wherein downstream of an intake inlet (13) for said filled sausage casing (B), said machine includes:

a device for squeezing the continuous filled-up casing (B) for defining portions (P); and successive pairs of first and second parallel plates between which said portions are engaged according to a tightened contact relation and defined by said squeezing device, the first and second plates (1, 1') of each pair advancing longitudinally into the machine from said squeezing device whilst retaining their tightened contact relation on said portions, and remaining in coincidence longitudinally whilst moving transversely at the same speed but in opposing directions so as to have the portion (P) each pair contains rotate, whereas the transverse movement directions are alternate between the first successive plates (1) and between the second successive plates (1') so that the continuous filled-up casing (B) driven by said pairs (1, 1') advances into the machine in the form of successive portions (P) between which a twist is formed owing to their resulting alternate directions of rotation.

2. Machine according to claim 1, wherein it further includes a cutting device for carrying out a sectioning of at least some of the twists embodied between the portions (P) so as to individualise them or group them.

3. Machine according to claim 1, wherein all the first plates (1) and all the second plates (1') are mounted in two identical endless strip arrangements (E, E') in which each plate (1 or 1') is able to move transversally, the two arrangements (E, E') being disposed so that two of their portions (7, 8') are parallel to each other so that said pairs of the first and second plates in which the continuous filled-up casing (B) moves are formed along the portions (7, 8').

4. Machine according to claim 3, wherein in the upper endless strip arrangement (E), each plate (1) is provided with a slight degree of freedom of movement so that along said portions (7, 8') parallel to each other, the spacing of the upper plate (1) with its lower counterpart (1') may vary according to the size of the continuous filled-up casing (B) placed between them, the upper plate (1) resting on the continuous filled-up casing (B) via the effect of its own weight.

5. Machine according to claim 3, wherein each endless strip arrangement (E or E') includes two identical lateral chains (4 or 4') engaged on downstream and upstream return means (2, 3 or 2', 3'), transverse slides (5 or 5') sliding bearing the plates (1 or 1') being mounted between said chains (4 or 4').

6. Machine according to claim 5, wherein along the portions (7, 8'), the chains (4, 4') pass into guides integral with the frame, said guides being position-adjustable so as to modify the spacing of the portions (7, 8') according to the size of the continuous filled-up casing (B) to be processed.

7. Machine according to claim 3, wherein means for transversally moving the plates (1, 1') along said portions (7, 8') firstly include a finger (10, 10') projecting orthogonally on the internal face of the plates (1, 1'), and secondly longitudinal guides (11, 12, 11', 12') for these fingers.

8. Machine according to claim 3, wherein said device for squeezing the continuous filled-up casing (B) is composed of two rotating elements (6, 6') cooperating with each other, the two rotating elements (6, 6') being mounted integral in rotation respectively on the shafts of the upstream return means of said endless strip arrangements (E, E').

9. Machine according to claim 3, wherein a cutting device is composed of two rotating elements (9, 9') cooperating with each other, the two elements (9, 9') being mounted integral in rotation respectively on the shafts of the downstream return means of said endless strip arrangements (E, E').

10. Machine according to claim 1, wherein said squeezing device consists of upper transversal pressing elements (17), each being mounted in a gap between the upper plates (1), and lower transversal pressing elements (17'), each being mounted in a gap between the lower plates (1'), each upper pressing element (17) coooperating with a lower pressing element (17') so as to squeeze the incoming sausage casing (B) and then next release it so that the twist can be made at the squeezing location.

11. ) Machine according to claim 10, wherein said transverse pressing elements (17, 17') are mounted respectively on the lateral chains (4, 4') which pass along said portions (7, 8') into guides, said guides forming cams so that along a first upstream portion of the portions (7, 8'), said upper (127) and lower (17') pressing elements of a given pair draw close together so as to squeeze the continuous filled-up casing (B) and then next move away so that the sausage casing can be twisted.

12. Machine according to claim 10, wherein each pair of upper and lower pressing elements (17, 17') is provided with a twist cutting device.

13. Machine according to claim 3, wherein the frame comprises two portions respectively bearing the units (E, E'), said two portions being joined to each other so as to clearly enable the portions (7, 8') to flow into an opening position.

14. Machine according to claim 1, wherein the external face of the plates (1, 1') is ribbed longitudinally.

\* \* \* \* \*